United States Patent
Wardrop

(10) Patent No.: US 7,451,217 B2
(45) Date of Patent: Nov. 11, 2008

(54) METHOD AND SYSTEM FOR PEER-TO-PEER AUTHORIZATION

(75) Inventor: Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 10/324,499

(22) Filed: Dec. 19, 2002

(65) Prior Publication Data

US 2004/0122958 A1 Jun. 24, 2004

(51) Int. Cl.
*G06F 15/173* (2006.01)
*G06F 15/16* (2006.01)

(52) U.S. Cl. .................. 709/225; 709/217; 709/218

(58) Field of Classification Search .......... 707/3, 707/10; 709/205, 223, 226, 217, 218, 225
See application file for complete search history.

(56) References Cited

U.S. PATENT DOCUMENTS

| | | | | |
|---|---|---|---|---|
| 5,491,752 | A | 2/1996 | Kaufman et al. | 380/30 |
| 5,506,961 | A * | 4/1996 | Carlson et al. | 726/5 |
| 6,339,423 | B1 * | 1/2002 | Sampson et al. | 715/854 |
| 6,381,602 | B1 * | 4/2002 | Shoroff et al. | 707/9 |
| 6,476,833 | B1 | 11/2002 | Moshfeghi | 345/854 |
| 6,591,290 | B1 * | 7/2003 | Clarisse et al. | 709/205 |
| 6,961,723 | B2 * | 11/2005 | Faybishenko et al. | 707/3 |
| 7,130,877 | B2 * | 10/2006 | McNeely et al. | 709/201 |
| 7,130,921 | B2 * | 10/2006 | Goodman et al. | 709/244 |

FOREIGN PATENT DOCUMENTS

| WO | WO 01/86392 A2 | 11/2001 |
|---|---|---|
| WO | WO 02/044843 | 6/2002 |
| WO | WO 2004/057517 | 8/2004 |

* cited by examiner

*Primary Examiner*—Ario Etienne
*Assistant Examiner*—Hussein Elchanti
(74) *Attorney, Agent, or Firm*—Hammiton & Terrile, LLP; Michael R. Cannatti

(57) ABSTRACT

An authorization mechanism within a peer-to-peer network is presented. A central server that operates a centralized data repository search engine within a peer-to-peer network performs authentication and authorization operations with respect to users that access its services. A user at a peer node reviews peer-to-peer search results that have been gathered and returned by the centralized search engine. When the user desires to retrieve a file from another peer node, the user's peer node must obtain an authorization token from the central server, which authenticates the user or has previously authenticated the user. The user's peer node then presents the authorization token along with a request to retrieve the file from the other peer node. After verifying the authorization token, the other peer node responds with the requested file. If the other peer node cannot verify the authorization token, then the other peer node denies access to the file.

11 Claims, 7 Drawing Sheets

METHOD AND SYSTEM FOR PEER-TO-PEER AUTHORIZATION

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer authorization.

2. Description of Related Art

There are two broad categories of approaches to providing commercial services for categorizing and locating information on the Web: (1) search engines that return direct hits to sites containing data that match inputted queries, such as AltaVista; (2) Web portals that organize the information into categories and directories, such as Yahoo!. These systems operate using a traditional client-server model for requesting and receiving search results.

The amount of Internet content continues to grow rapidly and to outpace the ability of search engines to index the exploding amount of information. The largest search engines cannot keep up with the growth, and it has been estimated that search engines only index about 5% to 30% of the information content on the Web. Hence, at the current time, the majority of Web content is not classified or indexed by any search engine.

Since the Web is a dynamic environment where content is constantly being added, updated, and changed, it is very difficult for centralized search engines to be up-to-date. The traditional Web client-server paradigm has been challenged by distributed file-sharing systems that support a peer-to-peer model for exchanging data. In peer-to-peer networks, each computer platform, or node, can operate as a hub, i.e., each node has both client functionality and server functionality. Each node has a list of addresses, most commonly Internet Protocol (IP) addresses, of several other nodes, or "peer nodes". These nodes can directly communicate with each other without a central or intermediate server.

Nodes within a peer-to-peer network form a distributed file-sharing system in which the nodes act cooperatively to form a distributed search engine. When a user at a node enters a search query, the search query is copied and sent to its list of peer nodes. Each peer node searches its own databases in an attempt to satisfy the search query. Each node copies the query to each node in its list of peer nodes while observing a time-to-live value in the query message. If a resulting query hit is made, then the node returns some type of query results to the originating node. A peer-to-peer search quickly fans out amongst a large number of nodes, which provides a useful manner for finding new content that has not yet been indexed by the large search engines.

Although peer-to-peer networks provide some advantages for finding content, each node within a peer-to-peer network is typically limited in terms of its available resources and its reach to other peer nodes. Hence, some of the advantages of both centralized indexing and peer-to-peer networks have been combined to produce so-called hybrid peer-to-peer networks. In these networks, a centralized server performs the majority of the indexing duties by indexing files that are available at the peer nodes while the peer nodes continue to store the files that have been indexed. In a hybrid peer-to-peer network, a user of a peer node locates a desired file through the centralized index and then retrieves the desired file from an identified peer node.

In comparison to the index that is created by a typical Web search engine, which constructs an index from content within files, the index at a centralized indexing server in a peer-to-peer network is somewhat limited because its index is generally constructed from a small amount of metadata about each indexed file, such as file size, title, author, date of publication, or other bibliographic data. Hybrid peer-to-peer networks work especially well, though, for certain types of files in which the content cannot be indexed and for which bibliographic data is sufficient for finding files of interest. For example, commercial services based on a hybrid peer-to-peer network are becoming available for purchasing and downloading audio and video files, which are selected through the use of bibliographic metadata.

While peer-to-peer networks have typically been created on an ad-hoc basis, enterprises are discovering commercial and non-commercial applications for peer-to-peer networks. In many situations, an enterprise does not want to create a massive centralized archive of all files that are created by employees of the enterprise, yet it would be convenient if employees of an enterprise could locate files of interest throughout the enterprise. Since most enterprises maintain some form of centralized data processing servers, hybrid peer-to-peer networks also work well within an enterprise, which can maintain a centralized indexing server that regards the desktop computers within the enterprise as peer nodes in a peer-to-peer network.

Enterprises have authentication and authorization systems for maintaining the integrity of data processing systems and the information that is stored within them. In a similar manner, commercial enterprises try to restrict access to their services to paying customers. While it may be convenient for users to have access to a hybrid peer-to-peer network for a commercial service or within an enterprise, the need for restricting file access to authorized users remains an issue for hybrid peer-to-peer networks. Therefore, it would be advantageous to provide a method and system for distributed access control within a peer-to-peer network.

SUMMARY OF THE INVENTION

An authorization mechanism within a peer-to-peer network is presented. A central server operates a centralized data repository search engine within a peer-to-peer network. The central server authenticates a user who requests access to its services from a peer node. A user submits a search to the centralized data repository search engine, which returns results from a search across the peer-to-peer network. After reviewing the search results, the user may desire to retrieve a file that is identified within the search results. Prior to requesting the file from the appropriate peer node, the user's peer node must obtain an authorization token from the central server, which determines whether the user is authorized to access the file based on configurable authorization policies. If the user is authorized to access the file, the central server returns an authorization token to the user's peer node, which then presents the authorization token along with a request to retrieve the file from the other peer node. After verifying the authorization token, the other peer node responds with the requested file. If the other peer node cannot verify the authorization token, then the other peer node denies access to the file.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
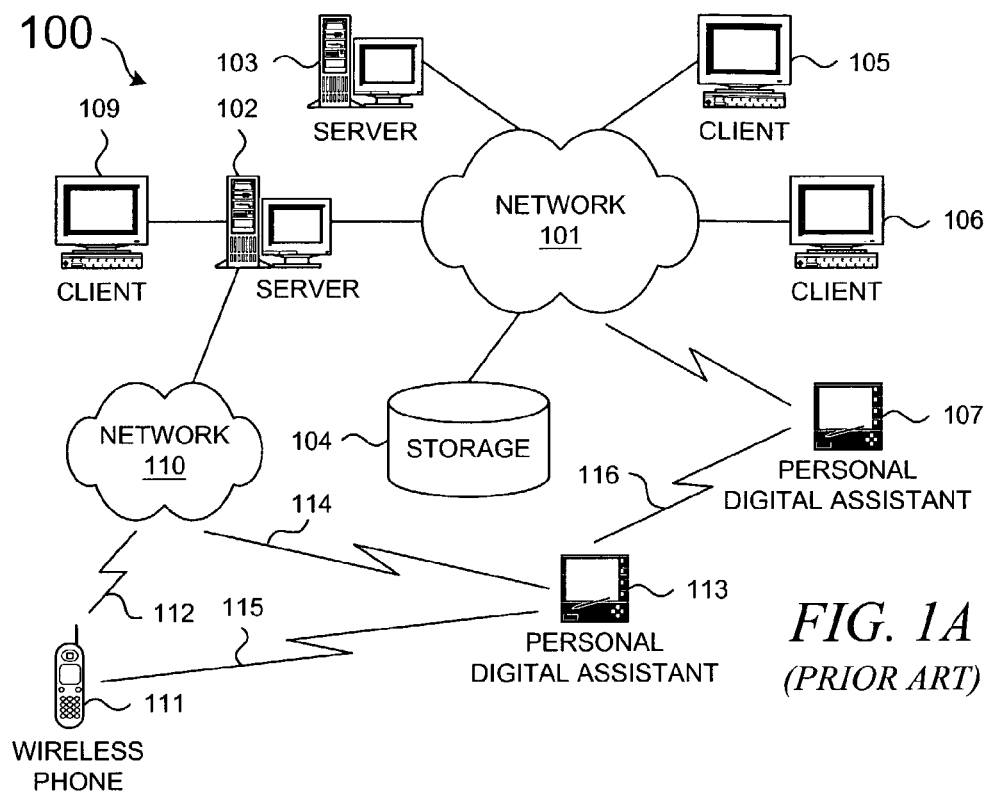
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
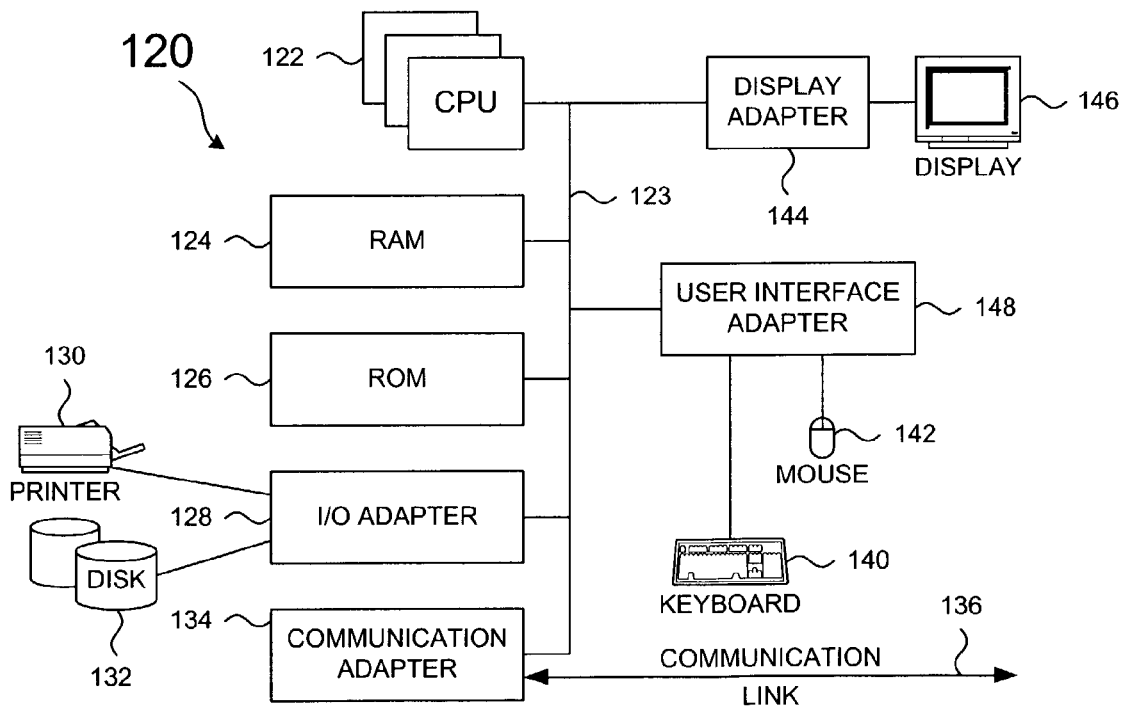
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, eXtensible Markup Language (XML), HyperText Markup Language (HTML), Handheld Device Markup Language (HDML), Wireless Markup Language (WML), and various other formats and types of files. It should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to providing a method and system for accessing information on a network that includes peer-to-peer networks or subnets. As background, a typical organization of software components within a peer-to-peer network is described prior to describing the present invention in more detail.

Figure 2A:
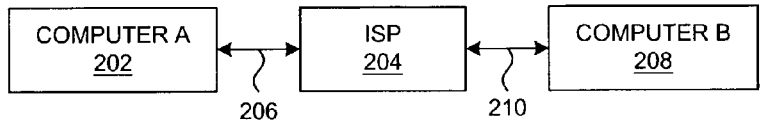
FIG. 2A is a block diagram that depicts a simplified, Internet-based connection between two computers.

With reference now to FIG. 2A, a block diagram depicts a simplified, Internet-based connection between two computers. Computer 202 communicates with ISP (Internet Service Provider) 204 across communication link 206, and computer 208 communicates with ISP 204 across communication link 210. Users of computers 202 and 208 can employ browsers and other networked applications, such as a peer-to-peer file sharing application, to send and receive information across a network, which includes the Internet in this example. Those of ordinary skill in the art will recognize that Internet-based connections between nodes 204 and 208 also may be achieved without using an ISP. For example, a local area network or corporate intranet may be used. The use of an ISP is not intended to be an architectural limitation of the present invention.

Figure 2B:
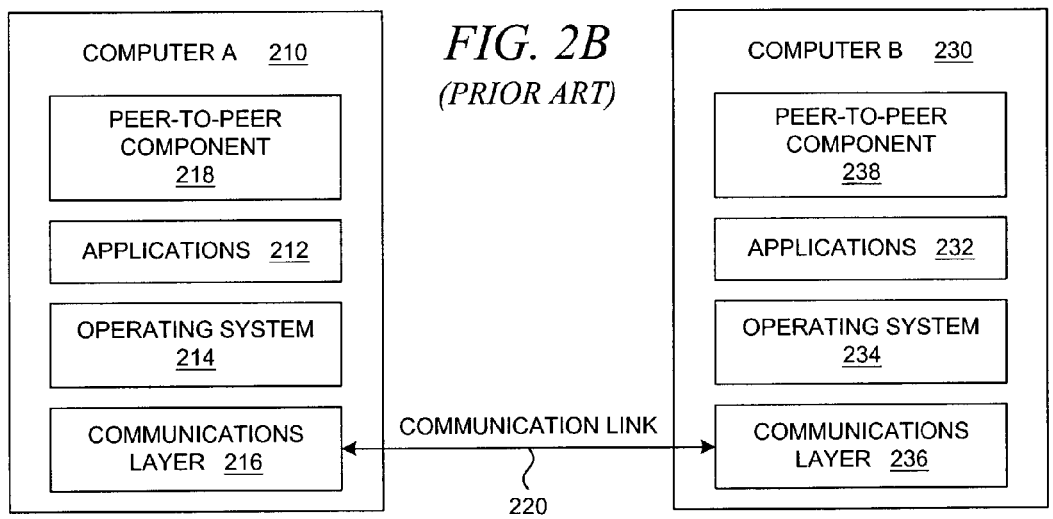
FIG. 2B is a block diagram that depicts software components within two computers that are operating as nodes within a peer-to-peer network.

With reference now to FIG. 2B, a block diagram depicts software components within two computers that are operating as nodes within a peer-to-peer network. Computer 210 has network-enabled applications 212 that use operating system 214 for various services, such as network communication services provided by communications layer 216. In addition, peer-to-peer component 218 may be a stand-alone applet or an application that provides peer-to-peer networking functionality to computer 210. Communication link 220 supports data traffic between computer 210 and computer 230, which has software components that correspond to those shown in computer 210: applications 232, operating system 234, communications layer 236, and peer-to-peer component 238. Peer-to-peer components 218 and 238 may provide support for a distributed, peer-to-peer file sharing function, as shown in more detail in FIG. 2C. It should be noted that although the examples hereinbelow describe the searching and retrieval of files, the units of information that are processed and transferred may be more readily recognized as general resources, which may comprise data elements, documents, datastreams, datastores, or other aggregations of data.

Figure 2C:
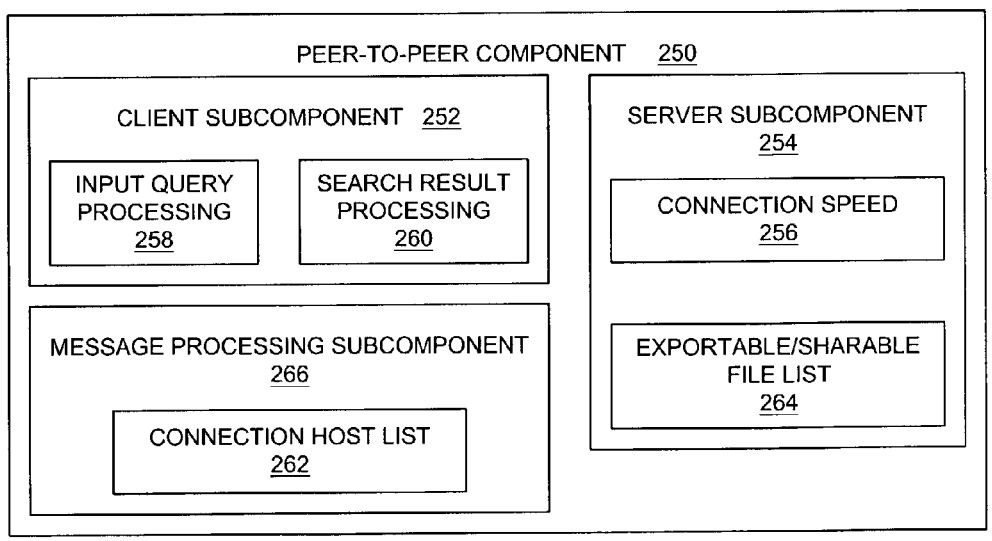
FIG. 2C is a block diagram depicting typical software subcomponents within a peer-to-peer software component that contains file sharing functionality.

With reference now to FIG. 2C, a block diagram depicts typical software subcomponents within a peer-to-peer software component that contains file sharing functionality. As noted previously, in peer-to-peer networks, each computer platform, or node, can operate as a hub, i.e., each node has both client functionality and server functionality. Peer-to-peer component 250 contains client subcomponent 252 and server subcomponent 254.

The method by which nodes in a peer-to-peer network connect with each other may vary with the type of peer-to-peer network. Generally, a client is dynamically assigned an IP address by an ISP when the client connects to the ISP, so the IP address possibly changes with each client session. In some implementations, a peer-to-peer connection between nodes in a peer-to-peer network is initiated when a user at a node manually enters either a domain name or an IP address (and optionally a port number) of an application of another node that is known to support peer-to-peer networking. The peer-to-peer application then establishes a connection with the other node at the specified address as a starting point within the network. For example, applications using the Gnutella protocol operate in this manner. Gnutella nodes also exchange connection speed, such as connection speed 256, that describe the speed of the network connection that is being used by the node. It should be noted, however, that the present invention can be implemented on a variety of peer-to-peer networks and is not limited by the peer-to-peer protocol that is used by the file sharing applications.

Nodes within a peer-to-peer network can act as a distributed file sharing system in which the nodes act cooperatively to form a distributed search engine. Client subcomponent 252 contains input query processing function 258 and search result processing function 260. When a user at a node enters a search query, the search query is copied to a list of peer nodes to which the node is connected, such as connection host list 262.

When a node receives the query, its server component, such as server component 254, processes the query. Each peer node searches its own databases in an attempt to satisfy the search query. Alternatively, a user has previously specified a list of files that the user is willing to export or share, such as file list 264, and the server subcomponent searches this list to find one or more files that satisfy the search query. Alternatively, rather than searching through a list of file names, the application may search the node's permanent storage for content that matches the search query. Depending on certain parameters within the query message, the node also forwards the query, e.g., by using message processing subcomponent 266, to each node in its list of connected peer nodes. If a resulting query hit is made, then the node returns some form of query results to the peer node that contacted it or to the originating node. In this manner, the search quickly fans out amongst a large number of nodes.

Figure 2D:
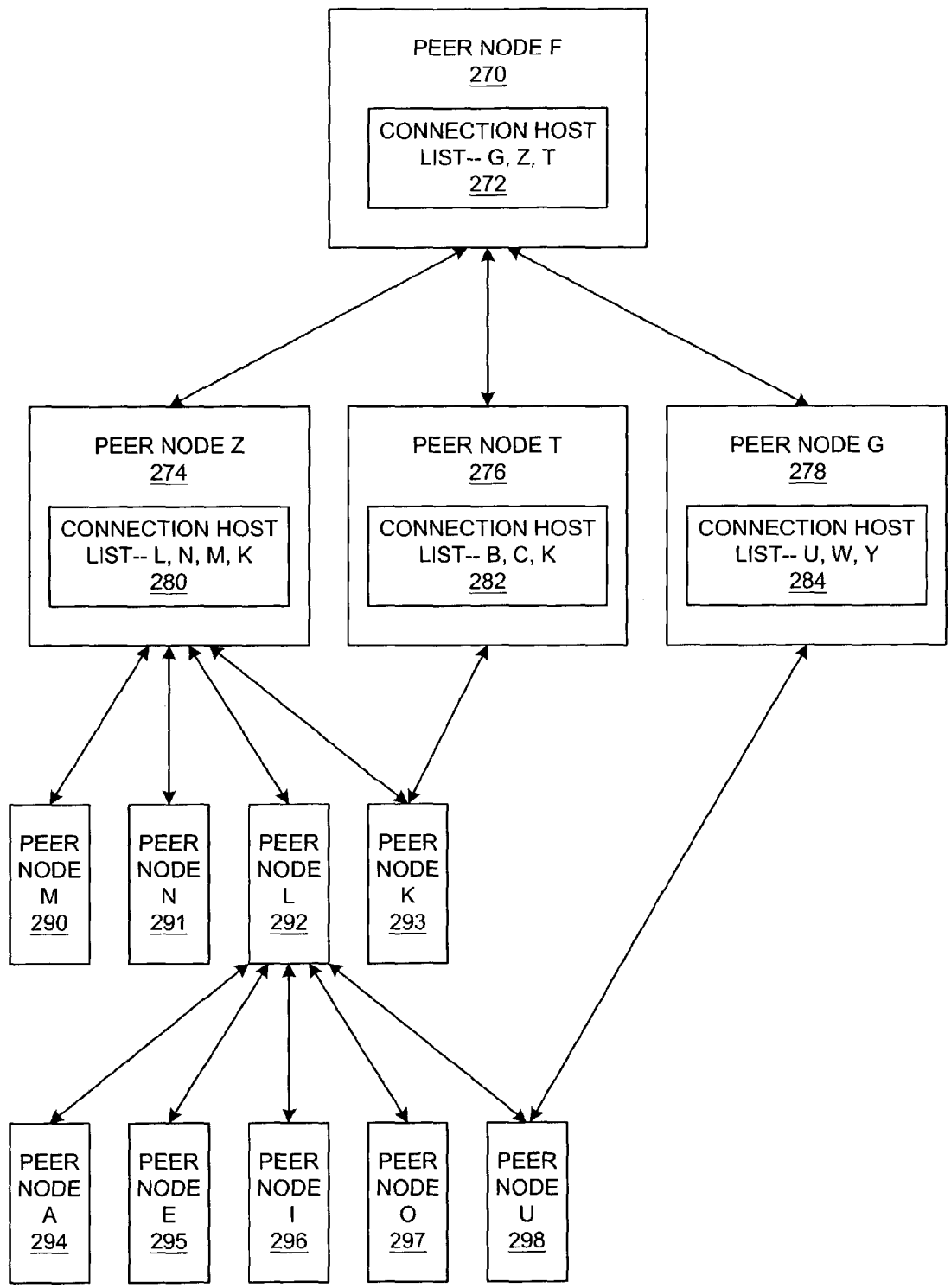
FIG. 2D is a block diagram depicting a typical network topology of nodes within a peer-to-peer network.

With reference now to FIG. 2D, a block diagram depicts a typical network topology of nodes within a peer-to-peer network. Peer node 270 has a connection host list 272 that identifies nodes 274-278 to which peer node 270 is connected, and nodes 274-278 have their own connection host lists 280-284, respectively. In this example, node 274 connects to nodes 290-293, and node 292 connects with nodes 294-298.

It should be noted that peer-to-peer networks do not have a structured topology, such as a strictly hierarchical organization amongst the nodes. In this example, node 276 also connects with node 293, and node 278 also connects with node 298. However, in order to distinguish immediately connected nodes from distant nodes, the set of nodes to which a particular node connects may be termed the "root nodes" of the particular node.

As noted above, the present invention is not limited to any particular peer-to-peer protocol that is used to implement the present invention. As background information, though, the Gnutella protocol is described in more detail as an example of the manner in which information may be passed in a peer-to-peer network between nodes that support a file sharing application. Reference may be made to the above description for FIG. 2C and FIG. 2D for components that would support file sharing within a peer-to-peer network using a protocol similar to Gnutella.

Gnutella is an Internet-based file searching/sharing program that combines both search engine functionality and file server functionality in a single application. When a user enters a search term into a Gnutella-enabled application at a node in the peer-to-peer network, a query message is generated with the appropriately formatted information, and the message is sent as a network packet to the user node's connected peers, i.e., peer nodes with which the user's node has already established a connection or session. Special codes within a Gnutella message header indicate the type of message, and each type of message has a unique code.

Any node within a certain distance from the user's node in the peer-to-peer network, i.e., within a certain node "hop count", will receive the query message; there is no mechanism to kill a query. As a query message moves through the connected nodes, a time-to-live (TTL) data field, which represents the hop count, is decremented. If the TTL field reaches zero, then the receiving node should not forward the query message, i.e., it should "drop the packet". Otherwise, the receiving node forwards the query message.

Each message contains a Globally Unique Identifier (GUID). When a new message is generated, a new GUID is also generated and placed within the new message. The manner in which the GUID is generated is not specifically specified by the Gnutella standard. When any message is received, the GUID is compared to a list of GUIDs, each of which were stored when its corresponding message was received. If the GUID is in the list, this fact indicates that the receiving node has seen this particular message previously because the GUIDs are supposed to be unique. Hence, if the GUID is in the list, then the node should not forward the received message because the receiving node's peer nodes would have also seen the message, and the packet can be dropped.

In addition, if the receiving node can fulfill the query, then the node creates a query hit (query reply) message and returns it to the node that originated the query message. The query hit message contains the address and port number of the responding node so that the originating node can send a message back to the responding node to retrieve a file if desired. The query hit message also contains the connection speed of the responding node and the number of search hits. For each query hit, the query hit message also contains the name of the file that satisfies the query and the size of that file. Other information may be included, such as length of the data content within the message, etc.

Assuming that the originating node has sufficient communication bandwidth, the results of the search should be received within a relatively short amount of time. The search results are stored or cached as they are received. The Gnutella-enabled application then presents the search results to the user in some fashion, and the user may select, through some type of user interface in the application, a filename that the user desires to retrieve. The application, which has stored the search results that include one or more nodes that responded with a search hit, can download a selected file to the user's node. Simple HTTP messages can be used for the download operation, such as a "Get" or a "Put" message (for a Gnutella "Push" request).

The Gnutella protocol operates without a central server. Unlike typical search engines, Gnutella searches anonymously, and there is no index. There is also no authentication process nor authorization process. There are other types of messages within the Gnutella protocol, such as "Ping" and "Pong", for discovering other nodes on the network and for responding to "Ping" messages. Additionally, a "Push" request message allows a node within the network but behind a firewall to be contacted to push a file to the outside of the firewall rather than attempting to pull the file from inside the firewall. It should be noted that the Gnutella protocol specification is an open specification and is subject to modification and fragmentation over time.

Figure 3:
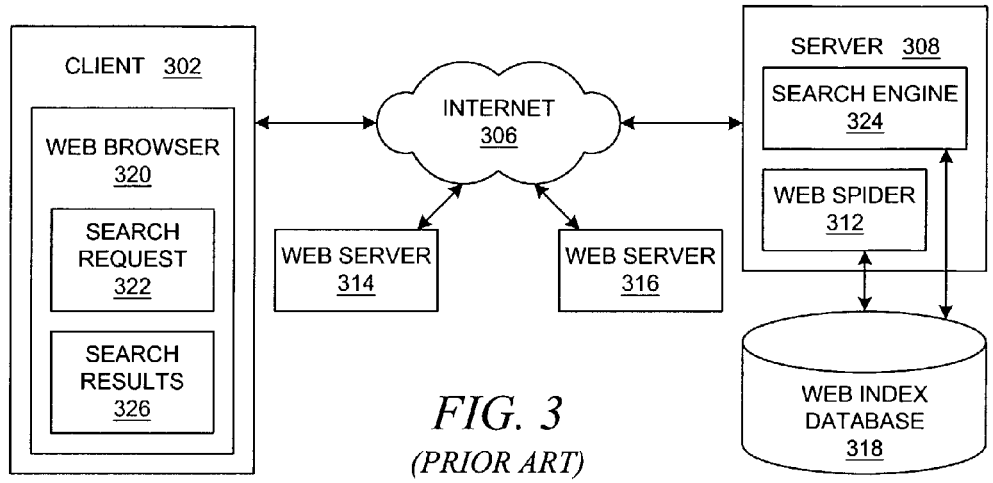
FIG. 3 depicts a typical, Web-based, indexing-type, search engine.

With reference now to FIG. 3, a typical, Web-based, indexing-type, search engine is depicted. Client 302 connects via communication link 304 to the Internet 306, and server 308 connects via communication link 310 to the Internet 306. Server 308 supports Web spider 312, which "crawls" the World Wide Web by following hyperlinks within Web pages or some other means in order to retrieve Web pages and other content from servers 314 and 316. The data gathered by the Web crawler is then indexed and stored within Web index database 318. Certain Web portals perform the indexing process continually.

At some point in time, a user at client 302 may desire to perform a search for specific content on the Web. The user operates Web browser application 320, or some other type of Internet-enabled or Web-enabled application, to retrieve a Web page from server 308 containing a search form for entering a search request or query 322. The user enters a search string, and the search request is sent to search engine 324 on server 308 in an appropriate format, such an HTTP message. The search engine searches through the previously generated index for content that satisfies the user query. If a query hit is generated, then the search results are returned to client 302, and the browser application displays the results for the user. The user may view the list of results and may determine whether or not to view the entire contents for an item prior to downloaded the item. In general, the search process is free, but various portals make a profit by selling advertising on their Web site.

Figure 4:
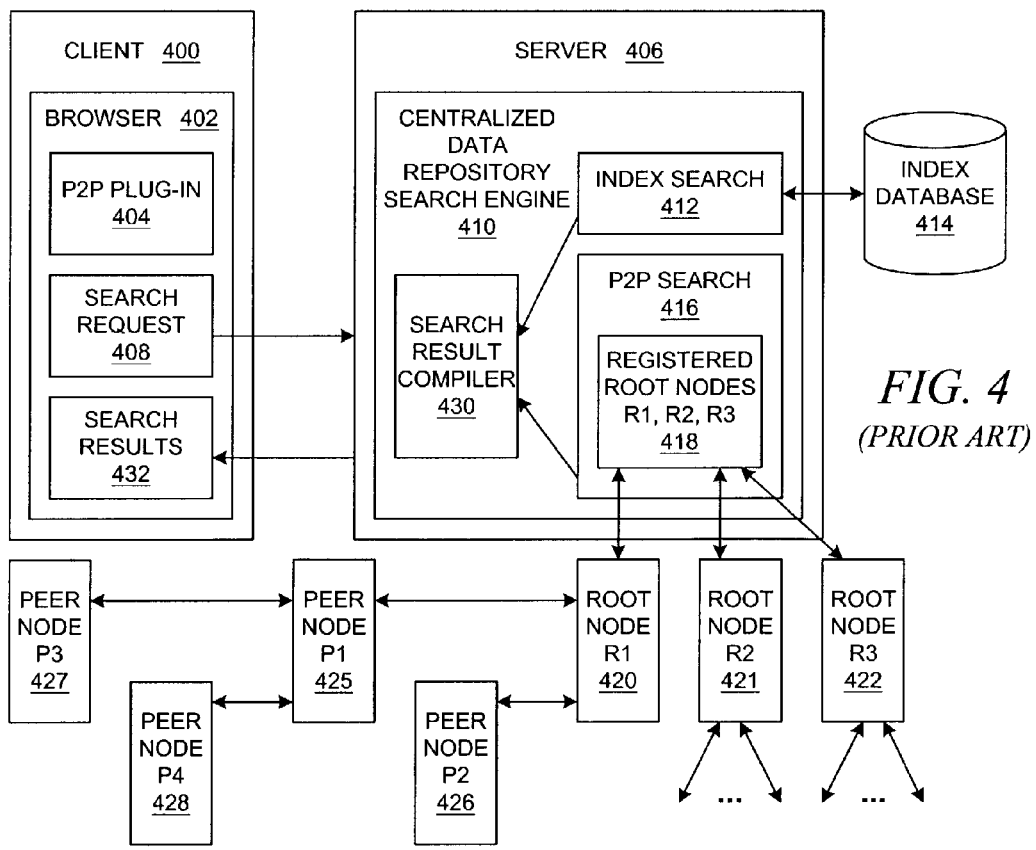
FIG. 4 depicts a typical peer-to-peer network with a centralized data repository search engine is depicted.

With reference now to FIG. 4, a typical peer-to-peer network with a centralized data repository search engine is depicted. In a manner similar to that shown in FIG. 3, FIG. 4 shows client 400 executing Web browser 402, which may incorporate or interoperate with peer-to-peer module 404, which may be a stand-alone application or may rely on browser 402 for execution support, such as its display and communication functionality. In this example, peer-to-peer module 404 is a browser plug-in.

Client 400 sends and receives information from server 406. At some point in time, a user at client 400 operates peer-to-peer component 404 through Web browser 402 to enter search request 408. Client 400 sends the search query in an appropriate format to centralized data repository search engine 410 on server 406.

Server 406 operates within a so-called hybrid peer-to-peer network. As mentioned above, in a hybrid peer-to-peer network, a user of a peer node locates a desired file through a centralized index and then retrieves the desired file from an identified peer node. In comparison to the index that is created by a typical Web search engine, which constructs an index from content within files, the index at a centralized indexing server in a peer-to-peer network is generally constructed from metadata about files at peer-to-peer nodes, such as file size, title, author, date of publication, or other bibliographic data.

Centralized data repository search engine 410, or alternatively some other component on server 406 or some other entity operating in cooperation with server 406, has previously completed a peer-to-peer crawling or spidering process to generate an index database. In response to the user's search request, search engine 410 uses index search facility 412 to search through index database 414.

Search engine 410 uses peer-to-peer search facility 416 to conduct a centralized distributed search process on a peer-to-peer network, possibly in addition to a conventional Web-based indexing operation. Search engine 410 indexes metadata that has been gathered from files at peer-to-peer nodes. The peer-to-peer indexing operation may be performed in a spidering manner such that the index database contains information that may be retrieved over a period of time. However, due to the dynamic nature of peer-to-peer networks, the index database require continuous updates such that the stored information is current and up-to-date.

Alternatively, a search request spawns a peer-to-peer search in real-time in response to an incoming request. The peer-to-peer search process uses registered root node list 418 as its connection host list. During some preceding period of time, the operator of server 406, e.g., a commercial Web site, has accepted registrations from users who desire to act as root nodes within the operator's peer-to-peer network. As is well-known in the art, a Web site can allow a user to register at the Web site, thereby creating some type of personal account for the user that is probably stored on a server within the Web site's domain. When the user registers with the server operator, search engine service, or other entity as necessary, the user supplies both technical information and optional personal information.

The user must supply technical information so that the server can establish a peer-to-peer connection with the user's computer or similar device. The technical information may include an IP address, a port number, and other data items. Alternatively, the user supplies some sort of electronic address that is eventually transformable into a destination address within a network protocol. Hence, other types of addresses in place of or in addition to IP addresses may be used as appropriate. For example, the user might supply a domain name address, which can be translated into an IP address through a domain name server in the Domain Name System (DNS). In that case, the server may be configured to accept many different kinds of traffic in addition to peer-to-peer networking traffic, but because the server can discern peer-to-peer packets, the server can process peer-to-peer packets appropriately while also processing Web-page requests and other types of data traffic.

If centralized data repository search engine 410 performs peer-to-peer searches in real-time in response to search request 408, peer-to-peer search facility 416 generates a query message containing a search query that is identical to or similar to original search query 408 that was received from client 400. Because of the nature of a peer-to-peer network and its ability to generate results that are not within the control of server 406, it may be necessary to adjust the search query in some manner prior to sending it to the root nodes. For example, a broad search query sent to many nodes could quickly overwhelm the ability of server 406 to accept the responses that a broad search query could trigger; the communication links to server 406 would quickly experience data traffic similar to a denial-of-service attack. Hence, the search query that is sent to the registered nodes is not necessarily the same as the original search query that was received from client 400. In other words, search engine 410 may run the original search query through some type of filter prior to initiating the peer-to-peer search.

The newly generated query message is then sent to each of the root nodes 425-428. The number of connection hosts that are used in the peer-to-peer search may depend on a variety of factors. For example, the list of registered root nodes may comprise many thousands of nodes, and employing too many nodes in the peer-to-peer search could quickly overwhelm the ability of server 406 to accept the responses. Hence, search engine 410 may perform a preliminary culling process on the list of registered root nodes prior to initiating the peer-to-peer search.

Assuming that the peer-to-peer search is at least partially successful, search engine 410 receives a set of results from one or more nodes in the peer-to-peer search. These results and/or results from index database 414 are meshed in some manner by search result compilation/merge facility 430; the compilation process may include a filtering operation on the search results to remove the appearance of duplicative hits and to reduce the size of the result dataset. A formatted presentation of the results, such as a Web page containing references to the search hits, is returned to Web browser 402. The user at client 400 may then view or process search results 432, after which the user may request the retrieval of a file that is identified within search results 432.

In response to the search query, the search engine receives metadata and/or other information about files that satisfy the parameters of the search query. In addition, the search engine either receives or records the identity of a source peer node that responded with results, and the identity of the peer node is stored in association with the results from that particular peer node. When the search results are returned to the client, the search results also contains the identity of the source peer nodes. In other words, each of the identified files within the search results is associated with information that identifies the source peer node that responded to the search query with an indication of a particular file that satisfied the search query.

When the user at client 400 requests the retrieval of a particular file within search results 432, peer-to-peer component 404 is able to send, in a typical peer-to-peer fashion, a request for the file directly to the source peer node that is identified and associated with the file information within search results 432. The source node then responds with the requested file.

As mentioned above, enterprises have authentication and authorization systems for maintaining the integrity of data processing systems and the information that is stored within them. While it may be convenient for users to have access to a hybrid peer-to-peer network, the need for restricting file access to authorized users remains an issue for hybrid peer-to-peer networks in prior art systems. The present invention is directed to providing authorization operations within a hybrid peer-to-peer network such that file access is restricted to authorized users. The present invention is described in more detail below with respect to the remaining figures.

Figure 5:
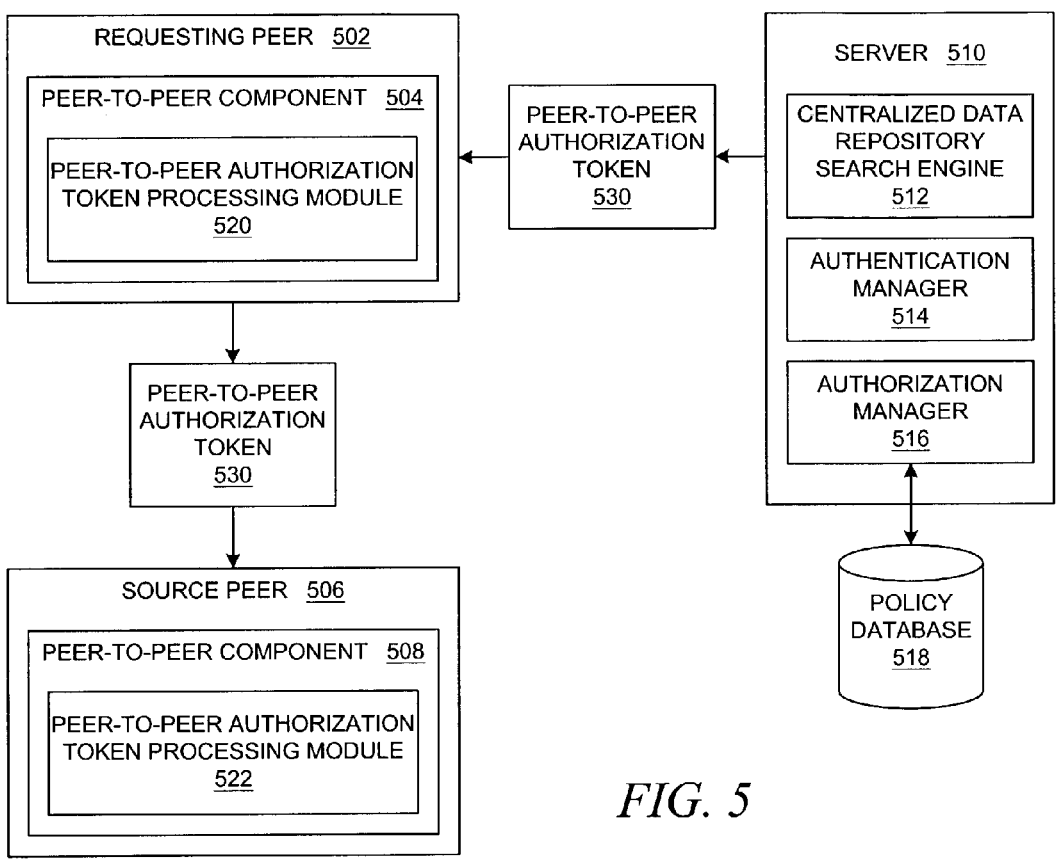
FIG. 5 depicts a block diagram that shows a hybrid peer-to-peer network with peer-to-peer components that have been extended to support distributed authorization operations in accordance with the present invention.

With reference now to FIG. 5, a block diagram depicts a hybrid peer-to-peer network with peer-to-peer components that have been extended to support distributed authorization operations in accordance with the present invention. In a manner similar to that described above, peer node 502 supports peer-to-peer component 504, and peer node 506 supports peer-to-peer component 508. In addition, server 510 supports centralized data repository search engine 512, and in a typical fashion, server 506 also supports authentication manager 514 and authorization manager 516, which accesses policy database 518 in order to obtain policies, access control lists, or other types of information for making authorization decisions for requested operations at server 506. The mechanisms for the supported back-end authentication and authorization operations may vary without affecting the scope of the present invention. It should be noted that the authorization operations may be performed by a distinct entity or service within a trusted domain in which server 506 operates such that server 506 performs search operations while the authorization entity performs authorization operations.

In contrast to the peer-to-peer components that were previously described above in other figures, FIG. 5 shows peer-to-peer components 504 and 508 that comprise peer-to-peer authorization token processing modules 520 and 522, respectively. These modules perform processing tasks with respect to obtaining or verifying peer-to-peer authorization token 530 as described in more detail below. In this example and the example described below with respect to FIGS. 6A-6B, peer node 502 requests a file from peer node 506, and these nodes have been labeled from that perspective for illustrative purposes: peer node 502 is a requesting peer because it originates a request for a file, while peer node 506 is a source peer because it provides or sources the requested file.

Figure 6A:
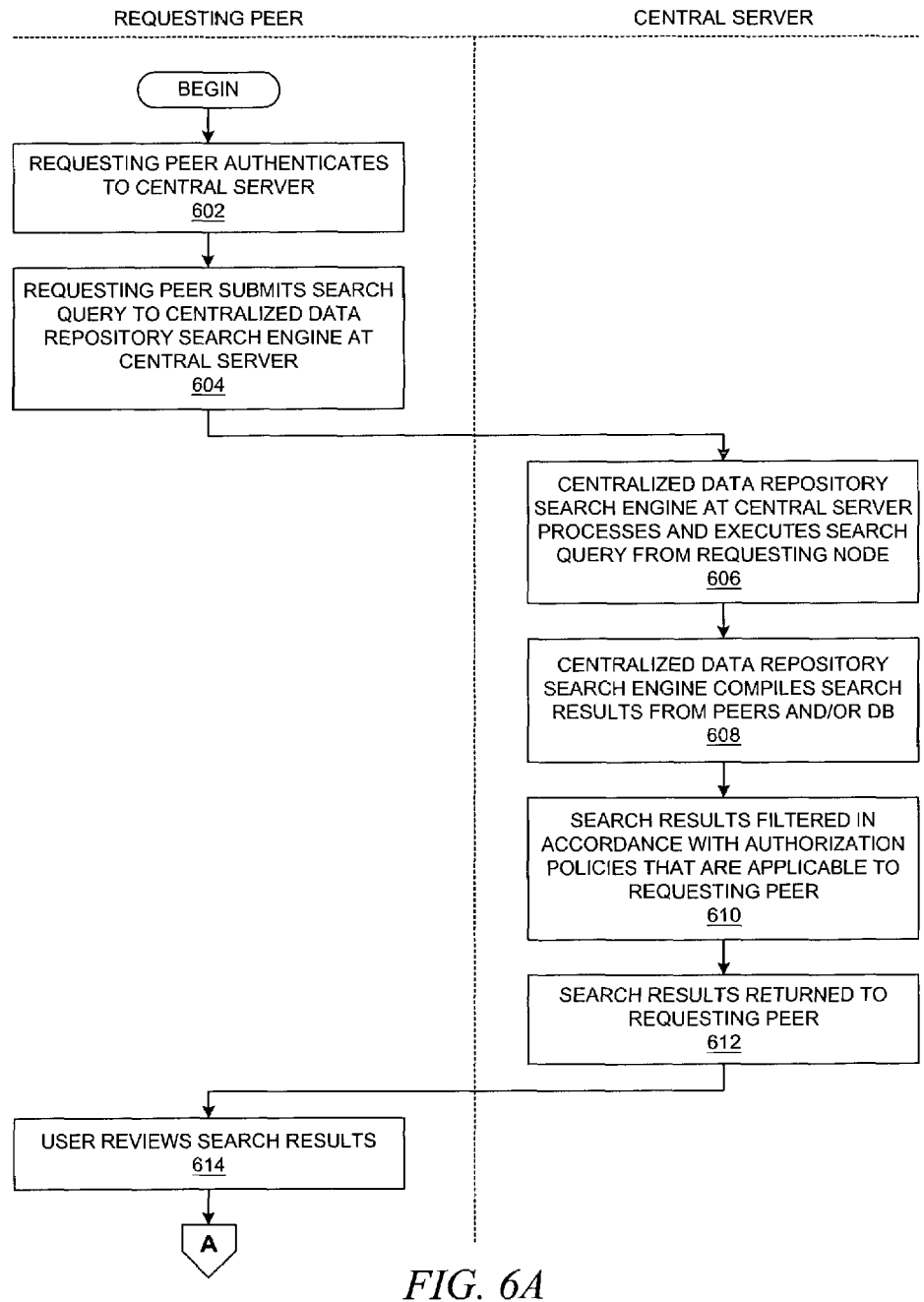
FIGS. 6A-6B depict a pair of flowcharts that shows a process by which a requesting peer within a hybrid peer-to-peer network obtains a file from a source peer in an authorized manner in accordance with the present invention.
Figure 6B:
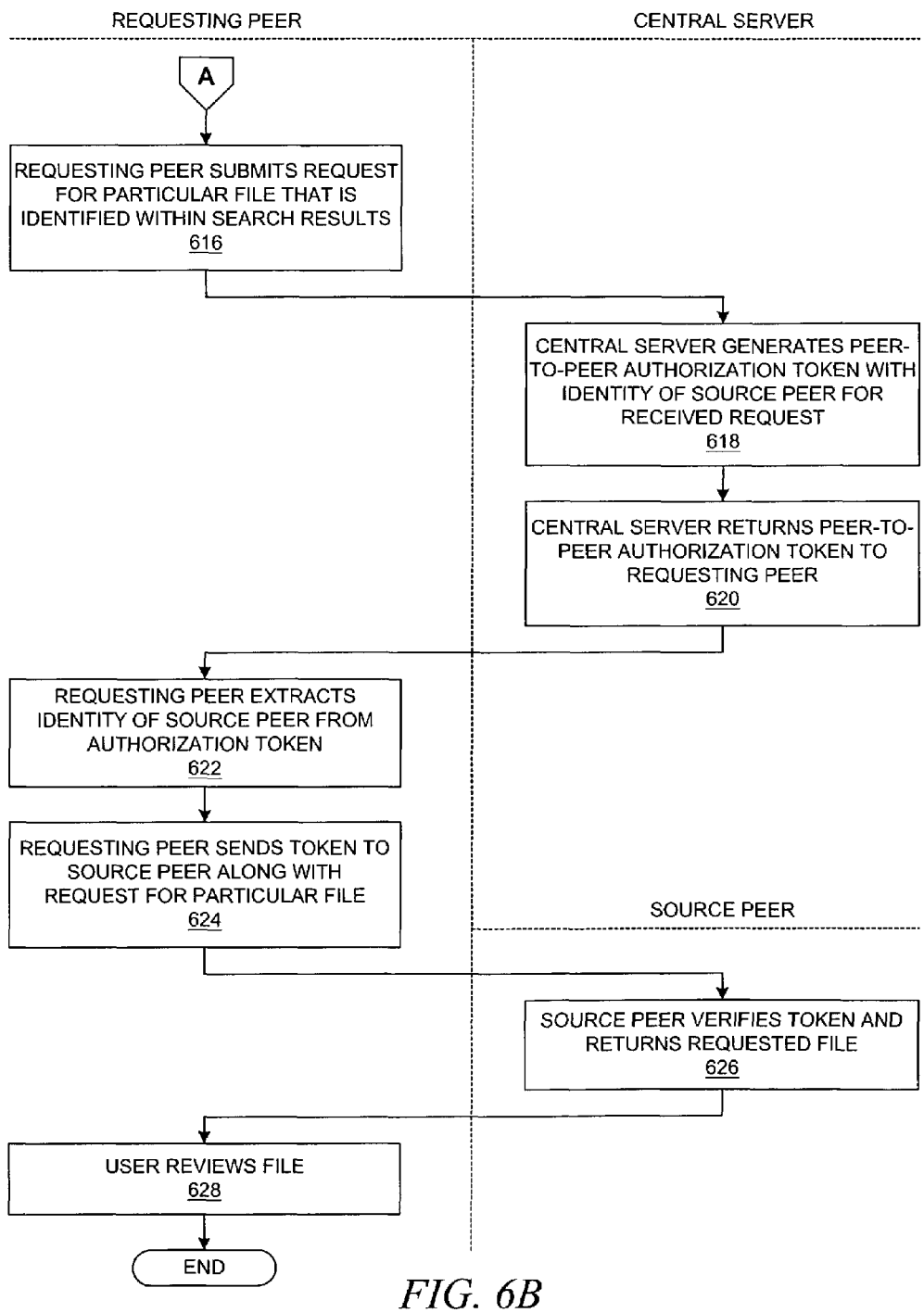

With reference to FIGS. 6A-6B, a pair of flowcharts depict a process by which a requesting peer within a hybrid peer-to-peer network obtains a file from a source peer in an authorized manner in accordance with the present invention. Referring now to FIG. 6A, the process begins with the requesting peer completing an authentication operation at a central server within a hybrid peer-to-peer network (step 602). For example, the user at the requesting peer may respond to a username/password challenge, or the requesting peer may automatically complete an authentication challenge using digital certificates.

In a manner similar to that described above with respect to FIG. 4, a search of the peer-to-peer network is requested and performed. The user at the requesting peer submits a search query to a centralized data repository search engine at the central server (step 604). Given that the central server has previously authenticated the requesting peer, the central server allows the search request to proceed by processing and executing the search query (step 606). The search process may include a search of a database maintained by the central server and/or a real-time search of the peer-to-peer network. The search engine then compiles the search results (step 608), which may include filtering out redundant hits or other filtering operations. For example, a search could be conducted within a corporate peer-to-peer network, and the search query could be satisfied by a document that represents a corporate memo that was distributed to all corporate employees, many of which have retained a copy on their desktop computers, i.e. the nodes within the corporate peer-to-peer network. The search engine is able to compare metadata about the respective copies of the file to determine that the files are redundant. In this example, only one of these files needs to be compiled into the resulting collection of search hits.

In contrast to the manner in which a search result was compiled within the system that is shown in FIG. 4, the centralized data repository search engine preferably filters the search results in accordance with any authorization policies that are applicable to the user and/or the requesting peer (step 610). An authorization subsystem at the central server maintains some type of authorization policies that contain various restrictions on the ability of users or groups of users to access various resources within a network. For example, a user may access certain files within the network only if the computer at which the user is working is within the network, thereby restricting remote access from a laptop in a possibly insecure environment. As another example, a user may have not have privileges to review corporate-finance-related information.

In one embodiment, when the search results are returned to the requesting peer, the resulting dataset does not contain any actual content from the files that satisfied the search query. Hence, the search results that are reviewed by the user at the requesting peer may provide only metadata about the search query hits, such as filename, author name, and date of creation. If the search results were not filtering in accordance with authorization policies, then the user would learn of the existence of certain files that satisfied the user's search query, and the mere existence of certain files may itself be confidential information that should only be provided to authorized persons. The present invention has an advantage such that, by applying authorization policies against the search results before the search results are returned to the requesting peer, the central server ensures that the user at the requesting peer does not even become aware of a resource that satisfied the search query.

After applying authorization policies against the search results, the filtered search results are returned to the requesting peer (step 612), and the requesting peer presents the search results to the user for review (step 614).

Referring now to FIG. 6B, at some point in time, the user selects a particular file that is identified within the displayed search results, and the requesting peer submits a request to the central server for the selected file (step 616). The central server then generates a peer-to-peer authorization token (step 618) and returns the token to the requesting peer (step 620). In a preferred embodiment, the peer-to-peer authorization token contains the identity of the source peer along with other information, as explained in more detail below. The requesting peer extracts the identity of the source peer from the authorization token (step 622) and sends the token to the source peer that has the requested file along with a request for the requested file (step 624). The source peer verifies the token and returns the requested file to the requesting peer (step 626). The user at the requesting peer can then review the obtained file (step 628), and the process is complete. If desired, the user can obtain other files by selecting other search query hits within the search results.

The data format of the authorization token may vary without affecting the scope of the present invention. As mentioned above, in a preferred embodiment, the authorization token contains the identity of the source peer. The identifier for the source peer may be a network address, a URI (Uniform Resource Identifier), or some other type of identifier. Using source peer identifier, the requesting peer can determine to which peer node within the peer-to-peer network the file request should be directed. In addition, the authorization token may also contain an identifier for the resource that the requesting peer has selected for retrieval; the identifier may be a URL (Uniform Resource Locator), or more generally, a URI. Although the search results that are received from the central server may already contain the identity of the source peers and the identifiers for the search query hits, the central server can enhance the integrity of the process by placing this information within the authorization token.

The integrity of the authorization token can be maintained by placing several information items within the token. For example, the authorization token may be given a creation timestamp and a validity period, or alternatively, an expiration timestamp, such that the authorization token becomes stale if not promptly used. Given the dynamic nature of a peer-to-peer network, the central server cannot guarantee the future existence of a resource that satisfied the search query; for example, a user at the source peer may delete a desired resource before the user at the requesting peer can request that particular resource. To avoid such data retention issues, the authorization token may be given a short validity period. In addition, the version number for the data format of the authorization token may also be inserted into the authorization token to ensure that the requesting peer and the source peer are interpreting the information within the authorization token in the same manner.

More importantly, the authenticity of the authorization token can be enforced through a digital signature. The central server can sign the authorization token with its private key, and anyone who possesses the authorization token and a copy of the central server's public key certificate can verify that the central server generated the authorization token, thereby preventing spoofing of authorization tokens by maliciously operated peer nodes. The digital signature also enhances the integrity of the authorization token because a recipient of the authorization token can verify that the authorization token has not been modified since the digital signature was applied.

The integrity and authenticity operations are not necessarily limited to the central server as the requesting peer could also perform operations with respect to the authorization token. For example, the requesting peer may also generate a digital signature over the authorization token, which the source peer could verify with a copy of the requesting peer's public key digital certificate. Assuming that the communication between the requesting peer and the central server does not occur over a secure communication link, this precaution would help to prevent a so-called man-in-the-middle attack in which a malicious party snoops on the transaction between the requesting peer and the central server. If the malicious party obtains a copy of an authorization token, then it could present the authorization token to the source node without the source node being able to determine that the malicious party for the requesting party and not the requesting peer. However, the central server could also place an identifier or location for the requesting peer within the authorization token, and the source node would then return a requested file only to the requesting peer as identified by the central server.

Digital certificates are often available from publicly accessible directories, such as LDAP directories; the location of an LDAP directory might be part of configurable information at each node within the peer-to-peer network. It may be assumed that if the requesting peer performs some type of operation over the authorization token, the requesting peer does not modify the authorization token but merely wraps the authorization token with additional information in accordance with PKCS (Public Key Cryptographic System) standards, such as a secure digital envelope wrapped around the authorization token.

For any integrity and authenticity operations that are applied to the authorization token by the central server and/or the requesting peer, the source peer can perform the appropriate procedure for verifying those operations. For example, if the authorization token indicates a validity period, then the source peer should ensure that the authorization token has been presented by the requesting peer within the validity period. If the central server has signed the authorization token, then the source peer can verify the signature; the inherent trust between the source peer and a certificate authority that issued the digital certificate for the central server provides assurance to the source peer that the authorization token is genuine.

As noted above, the present invention is not limited by the peer-to-peer protocol that is implemented within the peer-to-peer network. Depending upon the manner in which the present invention is incorporated into a peer-to-peer network, the peer-to-peer protocol may not need to be modified to allow peers to enforce the use of the peer-to-peer authorization token of the present invention. The authorization token may be incorporated as a portion of a response message from the central server to the requesting peer, and similarly, the authorization token may be incorporated as a portion of the request message from the requesting peer to the source peer. In other words, the authorization token is incorporated as part of the payload or content of typical peer-to-peer messages without requiring a new type of message within the peer-to-peer protocol.

Moreover, the manner in which the central server returns the authorization token to the requesting peer may vary without affecting the scope of the present invention. In the examples above, the requesting peer submits to the central server a request for a resource that was selected from a search result dataset that the requesting peer has previously received from the central server. After receiving the request, the central server then returns the authorization token that can be forwarded to the source peer.

In an alternative embodiment, the central server can attach/embed multiple peer-to-peer authorization tokens to/in the search result dataset when it is first returned to the requesting peer. In this manner, the requesting peer does not need to submit a subsequent request to the central server for the selected resource. The requesting peer may extract the appropriate authorization token from the search result dataset for the resource that will be requested; the identity of the source peer that is associated with the desired resource and the identifier for the desired resource could already be embedded within the authorization token.

In other words, the search result dataset may contain multiple data items for each search query hit, and one of those data items could be an authorization token for the identified resource for that particular search query hit. Given the fact that the requesting peer already possesses the source peer's identity, the resource's identifier, and an authorization token for that resource, the requesting peer may immediately send the request for the resource directly to the source peer rather than indirectly through the central server.

Although this procedure may be less secure than the procedure that is shown within FIGS. 6A-6B, it is not necessarily so. Similar security precautions could be applied to the authorization token, e.g., a digital signature from the central server and a short validity period for the authorization token. In addition, for each authorization token that is generated by the central server, the central server enforces a binding between the user, the desired resource in the search result dataset, and the authorization policy that allows the user to have authorized access to the resource the authorization token by including the identifier for the desired resource in the digitally signed authorization token. In this manner, the authorization token is not generally applicable to all resources within the peer-to-peer network, only the resource or resources that are identified within the authorization token.

Moreover, although this alternative procedure may be less efficient than the procedure that is shown within FIGS. 6A-6B, it is not necessarily so. If there are many search query hits, then the process of generating numerous authorization tokens would be inefficient. However, if there are only a few search query hits, then this alternative process could be more efficient because it reduces the overhead that would be required for responding to each request for a single requested resource.

Moreover, this alternative procedure could reduce the amount of authorization processing that is required in comparison to the procedure in FIG. 6. For example, the central server filters the compiled search results in accordance with any applicable authorization policies, so for each search query hit, the identified resources would pass an authorization check before being placed in the search result dataset. In the procedure shown in FIG. 6B, the central server preferably performs another authorization check at step 618 to ensure that the requested resource is a resource that the user or requesting peer is authorized to access. This additional authorization check ensures that the user or requesting peer has not obtained a resource identifier through an insecure or inappropriate manner and is then attempting to obtain a valid authorization token for that resource. Even if the request for the desired resource is digitally signed by the requesting peer or the request is carried over a secure communication link to ensure that the requesting entity is truly the previously authenticated requesting peer, the requesting peer could abuse the authorization process if the central server assumed that any requested resource could only be identified by a party that had legitimately learned of the identifier through a centralized search that had been produced through a filtered, authorized, search result dataset.

Hence, in the procedure shown in FIG. 6B, an identifier for a requested resource should pass through two authorization checks, whereas the alternative procedure requires only one. If the number of resources in the search result dataset is relatively small, then the alternative procedure should be more efficient. In another embodiment, the central server is configured to switch between the two authorization token generation procedures bases on a threshold number of search query hits in the search result dataset, thereby automatically producing an authorization token for the search query hits only if the number of search query hits is sufficiently small.

As noted above, the data format for the authorization token may vary. For example, the authorization token may be formatted in accordance with standards for authorization assertions. An assertion provides indirect evidence of some previous action; for example, assertions may provide indirect evidence of previous decisions or operations concerning identity, authentication, attributes, authorization decisions, and/or other types of information. A Security Assertion Markup Language (SAML) assertion is an example of an assertion format that may be used within a distributed data processing environment that implements the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The advantages of the present invention should be apparent in view of the detailed description of the invention that is provided above. The present invention provides a mechanism for distributed peer-to-peer access control through the use of a peer-to-peer authorization token that is issued by a central server that supports a centralized data repository search engine. The peer-to-peer authorization token extends existing peer-to-peer protocols by having the central server conduct an authorization decision for a requesting peer node. If the central server determines that the requesting peer node is authorized, then the central server generates an authorization token that the requesting peer node presents to the source node along with a request for an identified file. Based on the trust between the source node and the central server, the source node provides access to the requested file if the source node can verify that the authorization token is valid.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for an authorization operation, the method comprising:

receiving, at a central server within a peer-to-peer network from a first peer node within the peer-to-peer network, a search query for one or more resources within the peer-to-peer network;

identifying by the central server a resource at a second peer node that satisfies the search query;

in response to a determination that the first peer node or a user of the first peer node is authorized to access the resource, inserting by the central server information about the resource into a search result dataset;

returning by the central server the search result dataset to the first peer node;

receiving, by the central server, a selection of a resource from the search result dataset from the first peer node;

in response to a determination, by the central server, that the first peer node or a user of the first peer node is authorized to access the resource, generating an authorization token for the first peer node to access the resource at the second peer node; and returning the authorization token to the first peer node for use by the first peer node in sending a request to obtain the selected resource from the second peer node.

2. The method of claim 1 further comprising:
performing the generation of the authorization token in response to receipt of the selection of the resource.

3. The method of claim 1 further comprising:
attaching or embedding the authorization token in the search result dataset that is returned to the first peer node.

4. The method of claim 1 further comprising:
authenticating the first peer node or a user of the first peer node prior to generating the authorization token.

5. The method of claim 1 further comprising:
sending the authorization token from the first peer node to the second peer node to obtain access to the resource at the second peer node.

6. The method of claim 5 further comprising:
in response to a verification of the authorization token at the second peer node, providing access to the resource.

7. The method of claim 1 further comprising:
digitally signing the authorization token for subsequent verification.

8. The method of claim 1 further comprising:
inserting an identifier for the second peer node into the authorization token; and
extracting the identifier for the second peer node from the authorization token at the first peer node to identify the second peer node.

9. The method of claim 1 further comprising:
inserting an identifier for the resource into the authorization token; and
extracting the identifier for the resource from the authorization token at the second peer node to identify the resource.

10. The method of claim 1 wherein the authorization token is generated at the central server.

11. The method of claim 1 wherein the authorization token is generated at a trusted centralized authority.

* * * * *